United States Patent
De Schrijver et al.

(10) Patent No.: US 9,645,885 B2
(45) Date of Patent: May 9, 2017

(54) HYBRID DISTRIBUTED STORAGE SYSTEM

(71) Applicant: Amplidata NV, Ghent (BE)

(72) Inventors: Frederik De Schrijver, Wenduine (BE); Bastiaan Stougie, Melle (BE); Koen De Keyser, Sint-Denijs-Westrem (BE)

(73) Assignee: Amplidata NV, Ghent (BE)

(*) Notice: Subject to any disclaimer, the term of this patent is extended or adjusted under 35 U.S.C. 154(b) by 28 days.

(21) Appl. No.: 14/712,570

(22) Filed: May 14, 2015

(65) Prior Publication Data

US 2016/0335158 A1  Nov. 17, 2016

(51) Int. Cl.
G11C 29/00 (2006.01)
G06F 11/10 (2006.01)
G06F 3/06 (2006.01)

(52) U.S. Cl.
CPC .......... G06F 11/1076 (2013.01); G06F 3/064 (2013.01); G06F 3/067 (2013.01); G06F 3/0619 (2013.01)

(58) Field of Classification Search
CPC ............. G06F 11/1076; G06F 11/3409; G06F 3/0614; G06F 17/30283; G06F 11/2094; G06F 2211/1028; G06F 11/1004; G06F 17/30144; G06F 11/1464; G06F 3/0619; H04L 67/1097; H04L 63/0428; H04L 12/1881; H03M 13/373; H03M 13/1515; H03M 13/35; H03M 13/05
See application file for complete search history.

(56) References Cited

U.S. PATENT DOCUMENTS

| | | | |
|---|---|---|---|
| 7,181,578 B1* | 2/2007 | Guha | G06F 3/0607 711/154 |
| 8,386,840 B2 | 2/2013 | Stougie et al. | |
| 8,458,287 B2 | 6/2013 | Ozzie et al. | |
| 8,473,778 B2 | 6/2013 | Simitci et al. | |
| 8,677,203 B1* | 3/2014 | Shalvi | G06F 11/14 714/723 |
| 8,738,855 B2* | 5/2014 | De Spiegeleer | G06F 11/1076 711/114 |
| 2002/0078244 A1 | 6/2002 | Howard | |
| 2007/0177739 A1 | 8/2007 | Ganguly et al. | |

(Continued)

FOREIGN PATENT DOCUMENTS

EP  2 469 411 A1  6/2012
EP  2 469 413 A1  6/2012

(Continued)

OTHER PUBLICATIONS

Dimakis, A G et al. Network Coding for Distributed Storage Systems, Department of Electrical Engineering and Computer Science; dated 2008; 12 pages; University of California, Berkeley, CA.

*Primary Examiner* — Guerrier Merant
(74) *Attorney, Agent, or Firm* — Patent Law Works LLP

(57) ABSTRACT

There is provided a distributed object storage system that includes several performance optimizations with respect to efficiently storing data objects when coping with a desired concurrent failure tolerance of concurrent failures of storage elements which is greater than two and with respect to optimizing encoding/decoding overhead and the number of input and output operations at the level of the storage elements.

16 Claims, 6 Drawing Sheets

(56) References Cited

U.S. PATENT DOCUMENTS

| | | | |
|---|---|---|---|
| 2014/0129881 A1 | 5/2014 | De Schrijver et al. | |
| 2015/0039936 A1* | 2/2015 | Kazi | H04L 67/1097 |
| | | | 714/6.24 |
| 2016/0011935 A1* | 1/2016 | Luby | G06F 3/0617 |
| | | | 714/6.2 |
| 2016/0070740 A1* | 3/2016 | Vermeulen | G06F 17/30545 |
| | | | 707/703 |

FOREIGN PATENT DOCUMENTS

| | | |
|---|---|---|
| EP | 2 659 372 A1 | 11/2013 |
| EP | 2 672 387 A1 | 12/2013 |
| EP | 2 725 491 A1 | 4/2014 |
| EP | 2 659 369 B1 | 10/2014 |
| EP | 2 793 130 A1 | 10/2014 |
| WO | 2009/135630 A2 | 11/2009 |

* cited by examiner

HYBRID DISTRIBUTED STORAGE SYSTEM

FIELD OF THE DISCLOSURE

The present disclosure generally relates to a distributed data storage system. Typically, such distributed storage systems are targeted at storing large amounts of data, such as objects or files in a distributed and fault tolerant manner with a predetermined level of redundancy.

BACKGROUND

Large scale storage systems are used to distribute stored data in the storage system over multiple storage elements, such as for example hard disks, or multiple components such as storage nodes comprising a plurality of such storage elements. However, as the number of storage elements in such a distributed object storage system increases, equally the probability of failure of one or more of these storage elements increases. In order to be able to cope with such failures of the storage elements of a large scale distributed storage system, it is required to introduce a certain level of redundancy into the distributed object storage system. This means that the distributed storage system must be able to cope with a failure of one or more storage elements without irrecoverable data loss. In its simplest form redundancy can be achieved by replication. This means storing multiple copies of data on multiple storage elements of the distributed storage system. In this way, when one of the storage elements storing a copy of the data object fails, this data object can still be recovered from another storage element holding another copy. Several schemes for replication are known in the art. However, in general replication is costly with regard to the storage capacity. This means that in order to survive two concurrent failures of a storage element of a distributed object storage system, at least two replica copies for each data object are required, which results in a storage capacity overhead of 200%, which means that for storing 1 GB of data objects a storage capacity of 3 GB is required. Another well-known scheme used for distributed storage systems is referred to as RAID systems of which some implementations are more efficient than replication with respect to storage capacity overhead. However, often RAID systems require a form of synchronisation of the different storage elements and require them to be of the same type. In the case of a failure of one of the storage elements RAID systems often require immediate replacement, which needs to be followed by a costly and time consuming rebuild process in order to restore the failed storage element completely on the replacement storage element. Therefore known systems based on replication or known RAID systems are generally not configured to survive more than two concurrent storage element failures and/or require complex synchronisation between the storage elements and critical rebuild operations in case of a drive failure.

Therefore it has been proposed to use distributed object storage systems that are based on erasure encoding, such as for example described in WO2009135630, EP2469411, EP2469413, EP2793130, EP2659369, EP2659372, EP2672387, EP2725491, etc. Such a distributed object storage system stores the data object in fragments that are spread amongst the storage elements in such a way that for example a concurrent failure of six storage elements out of minimum of sixteen storage elements can be tolerated with a corresponding storage overhead of 60%, that means that 1 GB of data objects only require a storage capacity of 1.6 GB. It should be clear that in general distributed object storage systems based on erasure encoding referred to above differ considerably from for example parity based RAID 3, 4, 5 or RAID 6 like systems that can also make use of Reed-Solomon codes for dual check data computations. Such RAID like systems can at most tolerate one or two concurrent failures, and concern block-level, byte-level or bit-level striping of the data, and subsequent synchronisation between all storage elements storing such stripes of a data object or a file. The erasure encoding based distributed storage system described above generates for storage of a data object a large number of fragments, of which the number, for example hundreds or thousands, is far greater than the number of storage elements, for example ten or twenty, among which they need to be distributed. A share of this large number of fragments, for example 8000 fragments, that suffices for the recovery of the data object is distributed among a plurality of storage elements, for example ten storage elements, each of these storage elements comprising 800 of these fragments. Redundancy levels can now be flexible chosen to be greater than two, for example three, four, five, six, etc. by storing on three, four, five, six, etc. additionally 800 of these fragments. This can be done without a need for synchronisation between the storage elements and upon failure of a storage element there is no need for full recovery of this failed storage element to a replacement storage element. The number of fragments of a particular data object which it stored can simply be replaced by storing a corresponding number of fragments 800 to any other suitable storage element not yet storing any fragments of this data object. Fragments of different data objects of a failed storage element can be added to different other storage elements as long as they do not yet comprise fragments of the respective data object.

Additionally, in large scale distributed storage systems it is advantageous to make use of distributed object storage systems, which store data objects referenced by an object identifier, as opposed to file systems, such as for example US2002/0078244, which store files referenced by an inode or block based systems which store data in the form of data blocks referenced by a block address which have well known limitations in terms of scalability and flexibility. Distributed object storage systems in this way are able to surpass the maximum limits for storage capacity of file systems, etc. in a flexible way such that for example storage capacity can be added or removed in function of the needs, without degrading its performance as the system grows. This makes such object storage systems excellent candidates for large scale storage systems.

Current erasure encoding based distributed storage systems for large scale data storage are well equipped to efficiently store and retrieve data, however the processing power required for encoding and/or decoding data objects into a large number of fragments, and associated calculation delays, are a disadvantage of such systems. Additionally the high number of fragments spread amongst a higher number of storage elements leads to a relatively high number of input output operations at the level of the storage elements, which can become a bottleneck especially when for example a high number of relatively small data objects needs to be stored or retrieved. On the other hand replication based systems, don't cause such an encoding/decoding overhead, however they cause a large storage overhead, especially when it is desired to implement a large scale distributed storage system which can tolerate a concurrent failure of more than two storage elements.

Therefore there still exists a need for an improved distributed object storage system that is able to overcome the abovementioned drawbacks and is able to provide for an efficient storage overhead when coping with a desired concurrent failure tolerance of storage elements which is greater than two and which optimizes the encoding/decoding overhead and the number of input and output operations at the level of the storage elements.

SUMMARY

According to a first aspect, there is provided a distributed storage system comprising:
- a plurality of storage elements adapted to redundantly store and retrieve a data object on a storage set, which is a set comprising two or more of said storage elements of said distributed storage system, such that a desired concurrent failure tolerance of concurrent failures of the storage elements of the storage set can be tolerated;
- a plurality of storage nodes each comprising a share of said plurality of storage elements of the distributed storage system; and
- at least one controller node, coupled to or at least partly comprised within the storage nodes, the at least one controller node including a spreading module adapted to:
  - select a fragment storage subset comprising a fragment spreading width of the storage elements of said storage set, the fragment spreading width being the sum of:
    - a basic fragment storage element count corresponding to the number of storage elements of the fragment storage subset which are not allowed to fail; and
    - a redundant fragment storage element count corresponding to the number of storage elements of the fragment storage subset which are allowed to concurrently fail; and
  - select a replication storage subset comprising a replication storage count, which is equal to or greater than one, of the storage elements of the storage set, whereby the sum of the redundant fragment storage element count and the replication storage count is equal to or greater than the desired concurrent failure tolerance;
  - store on each storage element of the fragment storage subset a fragment sub-collection comprising at least an encoding multiple of fragments generated by a hybrid encoding module;
  - store on each storage element of the replication storage subset one replication copy generated by the hybrid encoding module;

wherein said hybrid encoding module is adapted to generate a fragment collection comprising at least said encoding multiple multiplied by said fragment spreading width of said fragments of said data object, and the replication storage count of replication copies of the data object.

This hybrid storage and retrieval option enables a distributed object storage system with a synergistic effect of enabling a more flexible, reliable and efficient way to cope with changing loads with respect to bandwidth, input output operations, storage capacity, processing power, etc. during operation of the distributed object storage system. This means for example that in conditions in which there is a high load on the available processing power or when the storage elements involved in a storage or retrieval operation are loaded with a high number of input output operations, the replication copy which requires minimal processing power and input output operations will allow for a fast response time for the storage and retrieval operations, even when the fragments, during a storage operation, take be spread amongst the fragment storage subset. This particular combination of encoded fragments and replication copies is furthermore highly unconventional in large scale distributed object storage systems as when it is desired to optimize storage cost generally encoded fragments will be preferred and replication copies will be avoided, and vice versa when processing power operations needs to be optimized replication copies will be preferred and encoded fragments will be avoided. This particular combination offered by the hybrid storage and retrieval option thus not only provides for a more efficient storage overhead when coping with a desired concurrent failure tolerance of more than two storage elements combined with a more optimal encoding/decoding overhead and an optimized number of input and output at the level of the storage elements, but also provides for additional robustness in dealing with varying bottlenecks during operation of the distributed storage system. Whether the bottleneck shifts between network bandwidth, storage capacity, input output operations, processing power, etc. and irrespective of the effects on the storage and retrieval operation resulting for example from the particular size or number of the data objects to be stored the hybrid storage and retrieval option will ensure a more robust, performant and responsive behaviour during a storage operation and subsequent retrieval operations.

According to an embodiment, the distributed storage system further comprises:
- a clustering module adapted to:
  - retrieve one of the replication copies stored by the spreading module from the replication storage subset; and/or
  - retrieve at least a basic fragment count of the fragments stored by the spreading module from the fragment storage subset from which said data object is decodable, said basic fragment count corresponding to said basic fragment storage element count multiplied by said encoding multiple; and
- a decoding module adapted to respectively:
  - generate the data object from the replication copy retrieved by the clustering module;
  - generate the data object from a combination of the fragments retrieved by the clustering module of which the number is at least the basic fragment count.

In this way the clustering and decoding module are able to realize a more robust, performant and responsive behaviour during subsequent retrieval operations by means of the synergistic effect provided by the availability of the combination of both the replication copy and the fragments for retrieval of the data object from the distributed storage system even when the bottleneck shifts between network bandwidth, storage capacity, input output operations, processing power, etc. and irrespective of the effects on the retrieval operation resulting for example from the particular size or number of the data objects to be retrieved.

According to an embodiment, the replication storage count is smaller than the redundant fragment storage element count, preferably the replication storage count is equal to one and the redundant fragment storage element count is greater than or equal to three.

In this way, the increase in storage cost by the replication copies is minimized, while still achieving levels of redundancy that are currently only available in large scale distributed object storage systems by means of encoded fragments.

According to an embodiment, the fragment storage subset comprises the replication storage subset and the desired concurrent failure tolerance is equal to the redundant fragment storage element count.

In this way, as the replication storage subset and the fragment storage subset overlaps the desired concurrent failure tolerance is in a simple way determined by the redundant fragment storage element count, while for example the availability of the replication copy is able to reduce the number of input output operations during for example subsequent retrieval operations.

According to an embodiment, the fragment storage subset and replication storage subset do not overlap and the redundant fragment storage element count is equal to the desired concurrent failure tolerance minus the replication storage count.

In this way the storage cost is still further optimized as the storage cost of the fragment storage subset is optimized by means of a reduction of the redundant fragment storage element count of the replication storage subset to a number lower than the desired concurrent failure tolerance, and thus a corresponding reduction of the storage cost. As there is no overlap between fragment storage subset and replication storage subset the replication storage count of replication copies on the replication storage subset enables still that the desired concurrent failure tolerance can be reached.

According to a further embodiment, the clustering module is further adapted to, during a retrieval operation, to:
 attempt to retrieve one of the at least one replication copy stored by the spreading module on the replication storage subset;
 if the attempt to retrieve one of the at least one replication copy fails, further attempt to retrieve at least the basic fragment count of the fragments stored by the spreading module on the fragment storage subset.

In this way a simple and efficient retrieval operation is realised that reduces the load with respect to the number of input output operations and processing power of the distributed storage system. This allows for reduced response times during retrieval of a data object from a storage element, as only one storage element is attempted first to be occupied for the retrieval, unlike the retrieval of fragment sub-collection of fragments from multiple storage elements of the fragment storage subset.

According to an embodiment, the hybrid encoding module is further adapted to first generate at least one of the replication storage count of replication copies of the data object.

In this way a particularly simple and efficient storage operation is realised in which processing power and the number of input output operations is reduced thereby reducing for example the responsiveness of the storage operation, whereby the replication copy is made available in simple and fast way for subsequent retrieval operations, while ongoing fragment encoding and spreading operations ensure the desired level of concurrent failure tolerance.

According to a preferred embodiment, the spreading module is further adapted to first store one of the replication copies on the replication storage subset as soon as it is generated by the hybrid encoding module.

This still further optimizes responsiveness of the storage operation of the distributed object storage system in a simple way.

According to an embodiment wherein, the distributed object storage system next to a hybrid storage and retrieval option mentioned above also comprises a replication storage and retrieval option; and when the distributed object storage system is operated according to said replication storage and retrieval option,
 the hybrid encoding module is further adapted to:
  generate a replication storage count of replication copies of the data object, the replication number being equal to one plus the desired concurrent failure tolerance.
 the spreading module is further adapted to:
  select the storage set comprising the replication storage count of the redundant storage elements of the storage set and store one of the replication copies generated by the hybrid encoding module on each redundant storage element of the storage set;
 the clustering module is further adapted to:
  retrieve one of the replication copies stored by the spreading module on the storage set; and
 the decoding module is further adapted to:
  generate the data object from the replication copy retrieved by the clustering module.

According to a preferred embodiment, the distributed object storage system is operated according to the hybrid storage and retrieval option when the size of the data object is greater than a predetermined first data object size threshold and in that the distributed object storage system is operated according to the replication storage and retrieval option when the size of the data object is smaller than or equal to the predetermined first data object size threshold.

Such an additional replication storage and retrieval option is preferable for such small data objects as the overhead associated with generation, storage and retrieval and decoding the large number of even smaller fragments is avoided. Additionally this reduces the negative impact of the effect of the block size of a file system on the storage elements, for example for a file system comprising a block size of 4 kB, this negative impact will be already relevant for data objects smaller than 128 kB, for an encoding scheme with a basic fragment storage element count k=10 and a redundant fragment storage element count f=6, this becomes a critical issue for data objects smaller than 64 kB and certainly for data objects with a size of less than ten times the block size of 4 kB.

According to an embodiment, wherein, the distributed object storage system next to a hybrid storage and retrieval option also comprises an encoding storage and retrieval option; and when the distributed object storage system is operated according to an encoding storage and retrieval option,
 the hybrid encoding module is further adapted, when storing the data object, to generate a fragment collection comprising at least an encoding multiple multiplied by a fragment spreading width of fragments of the data object, the fragment collection being configured such that the data object is decodable from any combination of the fragments of which the number corresponds to a basic fragment count which corresponds to a basic fragment storage element count multiplied by the encoding multiple;
 the spreading module is further adapted, when storing the data object, to:
  select a storage set comprising a fragment spreading width of the storage elements of the storage set, the fragment spreading width being the sum of:
   the basic fragment storage element count corresponding to the number of storage elements of the storage set which are not allowed to fail; and a redundant fragment storage element count corresponding to the number of storage elements of the storage set which are allowed to concurrently fail; whereby the redundant fragment storage element count is equal to or greater than the desired concurrent failure tolerance;

store on each storage element of the storage set a fragment sub-collection comprising at least an encoding multiple of fragments generated by a hybrid encoding module;

the clustering module is further adapted to retrieve at least the basic fragment count of the fragments stored by the spreading module from the storage set; and the decoding module is further adapted to generate the data object from a combination of the fragments retrieved by the clustering module of which the number is at least the basic fragment count.

According to a preferred embodiment, the distributed object storage system is operated according to the encoding storage and retrieval option when the size of the data object is greater than a predetermined second data object size threshold and in that the distributed object storage system is operated according to the hybrid storage and retrieval option when the size of the data object is smaller than or equal to the predetermined second data object size threshold.

Such an additional encoding storage and retrieval option is preferable very large data objects as an optimal use is made of the parallel bandwidth of these storage elements and their network connection during storage and retrieval operations and the use of storage capacity is further optimized and more efficient as with an encoding rate of $r=k/n=10/17$, the storage cost will only be a factor of 1.7. The predetermined second data object size threshold is for example 1 GB or any other suitable threshold for relatively large data objects.

According to a more preferred embodiment, the second data object size threshold is greater than the first data object size threshold.

It is clear that the second data object size threshold T2 is preferably several orders of magnitude greater than the first data object size threshold T1.

According to an embodiment, each fragment is associated with decoding data, the decoding data comprises a forward error correction code, for example an erasure code, preferably a rateless erasure code.

In this way the hybrid storage and retrieval option remains compatible with encoding and decoding modules of large scale distributed object storage systems that are able to provide a high level of desired concurrent failure tolerance while limiting the storage cost.

According to a second aspect, there is provided a method of operating a distributed storage system, such that a desired concurrent failure tolerance of concurrent failures of the storage elements of the storage set can be tolerated; the method comprising:

selecting, by the spreading module, a fragment storage subset comprising a fragment spreading width of the storage elements of the storage set, the fragment spreading width being the sum of:

a basic fragment storage element count corresponding to the number of storage elements of the fragment storage subset which are not allowed to fail; and a redundant fragment storage element count corresponding to the number of storage elements of the fragment storage subset which are allowed to concurrently fail; and selecting, by the spreading module, a replication storage subset comprising a replication storage count, which is equal to or greater than one, of the storage elements of the storage set, whereby the sum of the redundant fragment storage element count and the replication storage count is equal to or greater than the desired concurrent failure tolerance;

generating, by a hybrid encoding module, a fragment collection comprising at least the encoding multiple multiplied by the fragment spreading width of the fragments of the data object; and the replication storage count of replication copies of the data object.

storing on each storage element of the fragment storage subset a fragment sub-collection comprising at least an encoding multiple of fragments generated by the hybrid encoding module;

storing on each storage element of the replication storage subset one replication copy generated by the hybrid encoding module.

It is clear that according to an exemplary embodiment the fragment collection is generated by the hybrid encoding module such that the data object is decodable from any combination of the fragments of which the number corresponds to a basic fragment count which corresponds to the basic fragment storage element count multiplied by the encoding multiple.

BRIEF DESCRIPTION OF THE DRAWINGS

Exemplary embodiments will be described with reference to the Figures in which.

DETAILED DESCRIPTION OF EMBODIMENTS

Figure 1:
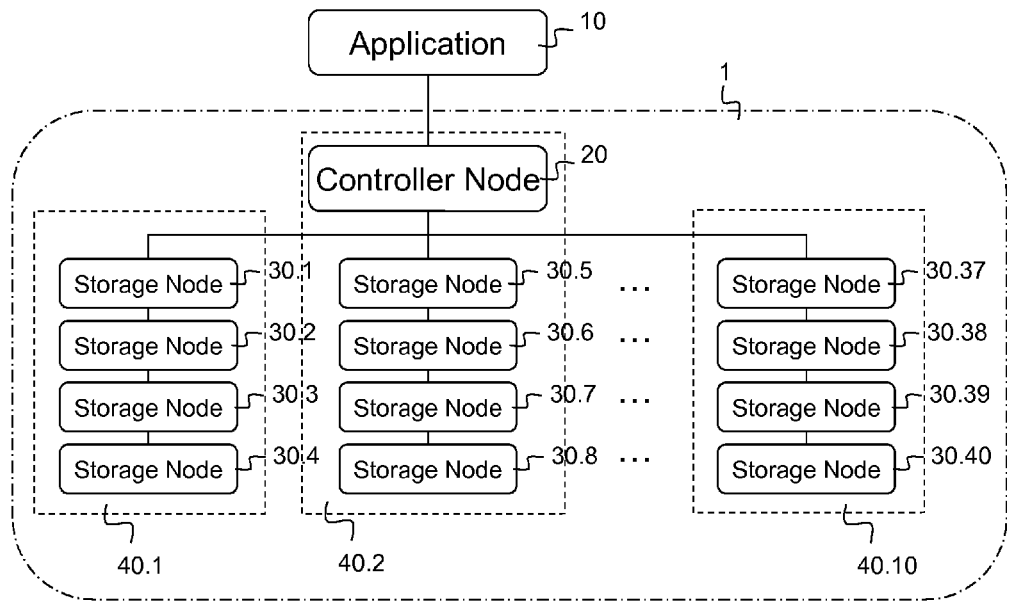
FIG. 1 illustrates an embodiment of a distributed storage system.

FIG. 1 shows an embodiment of a distributed storage system 1. According to this embodiment the distributed storage system 1 is implemented as a distributed object storage system 1 which is coupled to an application 10 for transferring data objects. The connection between the distributed storage system 1 and the application 10 could for example be implemented as a suitable data communication network. Such an application 10 could for example be a dedicated software application running on a computing device, such as a personal computer, a laptop, a wireless telephone, a personal digital assistant or any other type of communication device that is able to interface directly with the distributed storage system 1. However, according to alternative embodiments, the application 10 could for example comprise a suitable file system which enables a general purpose software application to interface with the distributed storage system 1, an Application Programming Interface (API) library for the distributed storage system 1, etc. As further shown in FIG. 1, the distributed storage system 1 comprises a controller node 20 and a plurality of storage nodes 30.1-30.40 which are all coupled in a suitable way for transferring data, for example by means of a conventional data communication network such as a local area network (LAN), a wide area network (WAN), a telephone network, such as the Public Switched Telephone Network (PSTN), an intranet, the internet, or any other suitable communication network or combination of communication networks. Controller nodes 20, storage nodes 30 and the device comprising application 10 may connect to the data communication network by means of suitable wired, wireless, optical, etc. network connections or any suitable combination of such network connections. Although the embodiment of FIG. 1 shows only a single controller node 20 and forty storage nodes 30, according to alternative embodiments the distributed storage system 1 could comprise any other suitable number of storage nodes 30 and for example two, three or more controller nodes 20 coupled to these storage nodes 30. These controller nodes 20 and storage nodes 30 can be built as general purpose computers, however more frequently they are physically adapted for arrangement in large data centres, where they are arranged in modular racks 40 comprising standard dimensions. Exemplary controller nodes 20 and storage nodes 30 are dimensioned to take up a single unit of such rack 40, which is generally referred to as 1 U. Such an exemplary storage node may use a low-power Intel processor, and may be equipped with ten or twelve 3 TB SATA disk drives and is connectable to the network over redundant 1 Gigabit Ethernet network interfaces. An exemplary controller node 20 may comprise high-performance, standard Intel Xeon based servers and provide network access to suitable applications 10 over multiple 10 Gigabit Ethernet network interfaces. Data can be transferred between suitable applications 10 and such a controller node 20 by means of a variety of network protocols including http/REST object interfaces, language-specific interfaces such as Microsoft .Net, Python or C, etc. Additionally such controller nodes comprise additional 10 Gigabit Ethernet ports to interface with the storage nodes 30. Preferably, such controller nodes 20 operate as a highly available cluster of controller nodes, and provide for example shared access to the storage nodes 30, metadata caching, protection of metadata, etc.

As shown in FIG. 1 several storage nodes 30 can be grouped together, for example because they are housed in a single rack 40. For example storage nodes 30.1-30.4; 30.5-30.8; . . . ; and 30.7-30.40 each are respectively grouped into racks 40.1, 40.2, . . . 40.10. Controller node 20 could for example be located in rack 40.2. These racks are not required to be located at the same location, they are often geographically dispersed across different data centres, such as for example rack 40.1-40.3 can be located at a data centre in Europe, 40.4-40.7 at a data centre in the USA and 40.8-40.10 at a data centre in China.

Figure 2:
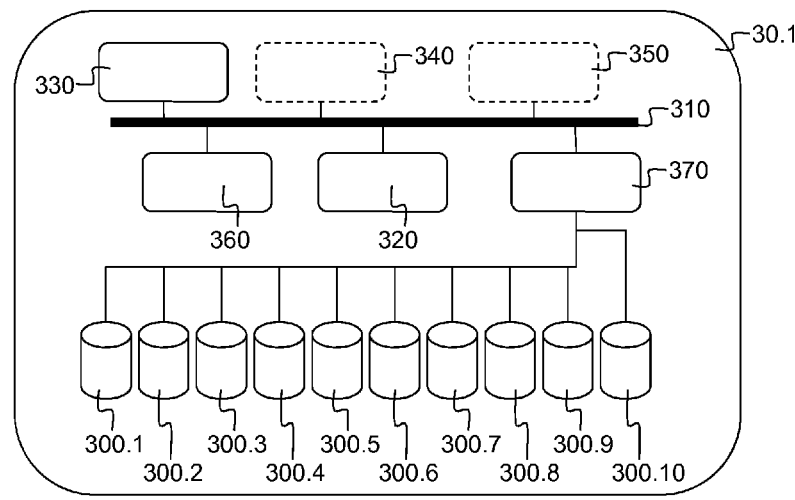
FIG. 2 schematically illustrates an embodiment of a storage node of the distributed storage system of FIG. 1.

FIG. 2 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370 and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or controller nodes 20 such as for example two 1 Gb Ethernet interfaces. Storage element interface 370 may comprise a storage interface such as for example a Serial Advanced Technology Attachment (SATA) interface or a Small Computer System Interface (SCSI) for connecting bus 310 to one or more storage elements 300, such as one or more local disks, for example 3 TB SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed object storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 2 the distributed storage system 1 comprises a plurality of storage elements 300. As will be described in further detail below, the storage elements 300, could also be referred to as redundant storage elements 300 as the data is stored on these storage elements 300 such that none of the individual storage elements 300 on its own is critical for the functioning of the distributed storage system. It is further clear that each of the storage nodes 30 comprises a share of these storage elements 300. As shown in FIG. 1 storage node 30.1 comprises ten storage elements 300.1-300.10. Other storage nodes 30 could comprise a similar amount of storage elements 300, but this is however not essential. Storage node 30.2 could for example comprise six storage elements 300.11-300.16, and storage node 30.3 could for example comprise four storage elements 300.17-300.20. As will be explained in further detail below with respect to FIGS. 5 and 6, the distributed storage system 1 is for example operable as a distributed object storage system 1 to store and retrieve a data object 500 comprising data 520, for example 64 MB of binary data and a data object identifier 510 for addressing this data object 500, for example a universally unique identifier such as a globally unique identifier (GUID). Embodiments of the distributed storage system 1 which operate as a distributed object storage system 1. Storing the data offered for storage by the application 10 in the form of a data object, also referred to as object storage, has specific advantages over other storage schemes such as conventional block based storage or conventional file based storage, such as scalability and flexibility, which are of particular importance in a distributed object storage system 1 that is directed to large scale redundant storage applications, sometimes also referred to as cloud storage.

The storage elements 300 are redundant and operate independently of one another. This means that if one particular storage element 300 fails its function it can easily be taken on by another storage element 300 in the distributed storage system 1. However, as will be explained in more detail further below, there is no need for the storage elements 300 to work in synchronism, as is for example the case in many well-known RAID configurations, which sometimes even require disc spindle rotation to be synchronised. Furthermore, the independent and redundant operation of the storage elements 300 allows any suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, PATA and so on. This results in advantages relating to scalability and flexibility of the distributed storage system 1 as it allows for adding or removing storage elements 300 without imposing specific requirements to their design in correlation to other storage elements 300 already in use in the distributed object storage system 1.

Figure 3:
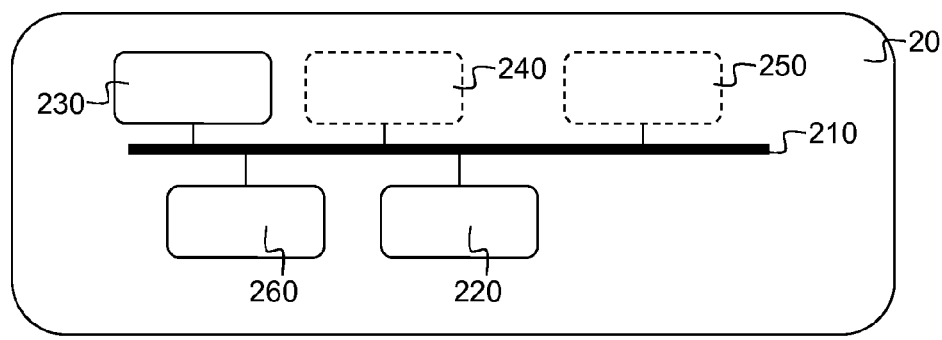
FIG. 3 schematically illustrates an embodiment of a controller node of the distributed storage system of FIG. 1.

FIG. 3 shows a schematic representation of an embodiment of the controller node 20. Controller node 20 may comprise a bus 210, a processor 220, a local memory 230, one or more optional input units 240, one or more optional output units 250. Bus 210 may include one or more conductors that permit communication among the components of controller node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the controller node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables controller node 20 to communicate with other devices and/or systems, for example mechanisms for communicating with other storage nodes 30 or controller nodes 20 such as for example two 10 Gb Ethernet interfaces.

According to an alternative embodiment the controller node 20 could have an identical design as a storage node 30, or according to still a further alternative embodiment one of the storage nodes 30 of the distributed object storage system could perform both the function of a controller node 20 and a storage node 30. According to still further embodiments the components of the controller node 20 as described in more detail below could be distributed amongst a plurality of controller nodes 20 and/or storage nodes 30 in any suitable way. According to still a further embodiment the device on which the application 10 runs is a controller node 30.

Figure 4:
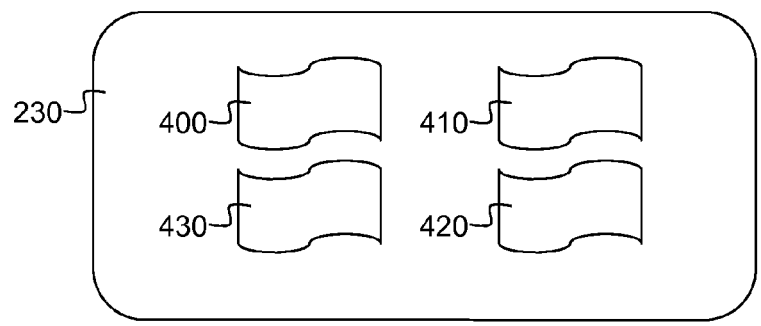
FIG. 4 schematically illustrates some elements of the controller node of FIG. 3 in more detail.

As schematically shown in FIG. 4, an embodiment of the controller node 20 comprises four modules: a hybrid encoding module 400; a spreading module 410; a clustering module 420; and a decoding module 430. These modules 400, 410, 420, 430 can for example be implemented as programming instructions stored in local memory 230 of the controller node 20 for execution by its processor 220.

The functioning of these modules 400, 410, 420, 430 will now be explained to FIGS. 5 and 6. The distributed storage system 1 stores a data object 500 as provided by the application 10 in function of a reliability policy which guarantees a level of redundancy. That means that the distributed object storage system 1 must for example guarantee that it will be able to correctly retrieve data object 500 even if a number of storage elements 300 would be unavailable, for example because they are damaged or inaccessible. Such a reliability policy could for example require the distributed storage system 1 to be able to retrieve the data object 500 in case of seven concurrent failures of the storage elements 300 it comprises. In large scale data storage massive amounts of data are stored on storage elements 300 that are individually unreliable, as such redundancy must be introduced into the storage system to improve reliability. However the most commonly used form of redundancy, straightforward replication of the data on multiple storage elements 300, similar as for example RAID 1, is only able to achieve acceptable levels of reliability at the cost of unacceptable levels of overhead. For example, in order to achieve sufficient redundancy to cope with seven concurrent failures of storage elements 300, each data objects 500 would need to be replicated until eight replication copies are stored on eight storage elements, such that when seven of these storage elements fail concurrently, there still remains one storage element available comprising a replication copy. As such, storing 1 GB of data objects in this way would result in the need of 8 GB of storage capacity in a distributed storage system, which means an increase in the storage cost by a factor of eight or a storage overhead of 800%. Other standard RAID levels are only able to cope with a single drive failure, for example RAID 2, RAID 3, RAID 4, RAID 5; or two concurrent drive failures, such as for example RAID 6. Although it would be possible to reach higher redundancy levels with for example nested RAID levels, such as for example RAID 5+0, which could provide for a concurrent failure tolerance of seven storage elements when providing seven RAID 0 sets, each of these sets comprising a three disk RAID 5 configuration. However, it should be clear that in such nested RAID configurations, such as for example RAID 5+0 or RAID 6+0, high levels of synchronisation of the storage elements are preferred, and that the rebuild process in case of a drive failure is critical, often leading to the necessity to provide hot spares, which further reduce the storage efficiency of such configurations. Additionally each increase in the level of redundancy leads to the need for providing an additional synchronised set comprising the minimum number storage elements needed for the lowest level RAID configuration and associated control systems. Therefore, as will be described in more detail below, the distributed storage system 1 will make use of erasure coding techniques in order to achieve the requirements of the reliability policy with higher redundancy levels that can be achieved with standard RAID levels with considerably less storage overhead. As will be explained in further detail below when using erasure encoding with a rate of encoding r=10/16 six concurrent failures of storage element 300 can be tolerated on 16 storage elements 300, which requires a storage overhead of 60% or a storage cost of a factor of 1.6. This means that storing 1 GB of data objects in this way will result in the need for 1.6 GB of storage capacity in a fragment storage subset 34 of the distributed storage system 1. Some known erasure encoding techniques make use of Reed-Solomon codes, but also fountain codes or rateless erasure codes such as online codes, LDPC codes, raptor codes and numerous other coding schemes are available. However as will be explained in further detail below, a storage and/or retrieval operation of a single data object then results in the need for accessing at least ten of the storage elements and thus a corresponding increase in the number of input/output operations per storage element of the distributed storage system. Especially in the case of frequently accessed data objects and/or in the case of a high number of storage and/or retrieval operations the maximum number of input/output operations of the storage elements could become a bottle neck for the performance of the distributed object storage system.

Figure 5:
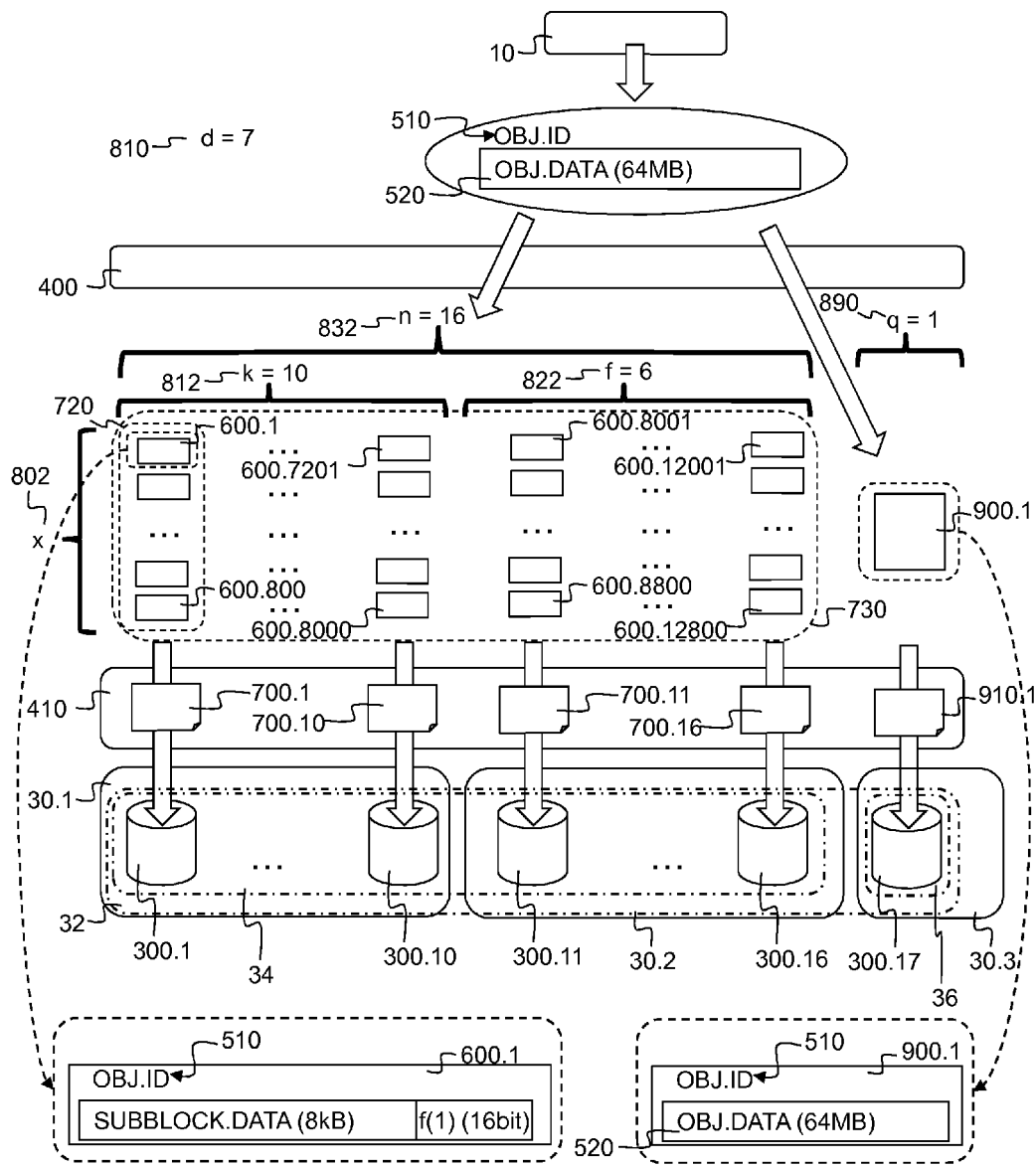
FIG. 5 schematically illustrates a storage operation according to the hybrid storage and retrieval option.

FIG. 5 shows a storage operation according to a hybrid storage and retrieval option performed by an embodiment of the distributed storage system 1 that is able to tolerate seven concurrent failures of a storage element 300. This means that the distributed storage system 1 comprises a plurality of storage elements 300, for example hundred or more, adapted to redundantly store and retrieve a data object 500 on a storage set 32 comprising a set of these storage elements 300, for example eight, nine, ten or more, such that a desired concurrent failure tolerance 810 of seven concurrent failures of these storage elements 300 of this storage set 32 can be tolerated. As will be explained in further detail below, the storage set 32 comprises for example seventeen storage elements 300, for example storage elements 300.1-300.17 as shown in FIG. 5, of which a concurrent failure of any seven of these seventeen storage elements 300 can be tolerated without loss of data. This means that the distributed storage system 1 is operated such that a desired concurrent failure tolerance 810, which is equal to seven or d=7, of concurrent failures of the storage elements 300 of the storage set 32 can be tolerated. As shown, according to this embodiment, the data object 500 is provided to the distributed storage system 1 by the application 10 which requests a storage operation for this data object 500. As further shown, according to this embodiment, the data object 500 comprises an object identifier 510, such as for example a GUID, and object data 520, for example 64 MB of binary data.

According to this embodiment, the storage set 32 comprises seventeen storage elements 300 for storing the data object 500 in the following way. It is clear that systems could comprise much more than seventeen storage elements 300, for example a storage set could comprise more than a hundred or more than thousand storage elements 300. According to the embodiment shown in FIG. 5, as shown, the spreading module 410 selects a replication storage subset 36 comprising a replication storage count 890 of storage elements of the storage set 32, which is in this embodiment one storage element 300.17. Storage set 32 comprises the fragment storage subset 34 of storage elements 300.1-300.16 and the replication storage subset 36 with storage element 300.17. In this embodiment, these storage subsets 34, 36 of the storage set 32 are complementary to each other, i.e. they do not overlap. In an alternative embodiment, the fragment storage subset 34 and the replication storage subset 36 could at least partly overlap. This means that at least one storage element 300 will store both fragments and a replication copy as explained in further detail below.

The data object 500 is offered to the hybrid encoding module 400 of the controller node 20. The hybrid encoding module 400 generates a replication copy 900.1 of the data object 500, comprising a data object identifier 510 and the object data 520. Subsequently, as shown in FIG. 5, the spreading module 410 will store on storage element 300.17 of the replication storage subset 36, the replication copy 900.1 generated by the hybrid encoding module 400.

According to an embodiment, the storage elements 300 of the replication storage subset 36 comprise a suitable file system in which the object data 520 is stored by the spreading module 410 in the form of a replication file 910.1. Preferably the spreading module 410 stores the object data 520 on a single storage element 300.17 into the replication file 910.1 that is subsequently stored in the file system that is in use on the respective storage element 300.17. As shown in FIG. 5 storage element 300.17 is for example arranged in storage node 30.3.

According to an embodiment, the hybrid encoding module 400, for example, first generates at least one of the replication storage count 890 of replication copies 900 of the data object 500 and the spreading module 410 first stores one of the replication copies 900 on the one or more storage elements 300 of the replication storage subset 36 as soon as it is generated by the hybrid encoding module 400, before generating a fragment collection 700 as will be discussed further. However, it is clear that alternative embodiments are possible in which fragments and replication copies are concurrently generated and spread.

The spreading module 410 also selects a fragment storage subset 34 comprising a fragment spreading width 832 of the storage elements 300 of the storage set 32. As shown, according to this embodiment, the fragment spreading width 832 equals n=16. This fragment spreading width 832 is the sum of a basic fragment storage element count 812 corresponding to the number of storage elements 300 of the fragment storage subset 34 which are not allowed to fail and a redundant fragment storage element count 822 corresponding to the number of storage elements 300 of the fragment storage subset 34 which are allowed to concurrently fail. Hence, according to this embodiment the redundant fragment storage element count 822 (i.e. f=6) is equal to the desired concurrent failure tolerance 810, i.e. d=7, minus the replication storage count 890, i.e. q=1.

During a storage operation, the data object 500 is offered to the hybrid encoding module 400 of the controller node 20. The hybrid encoding module 400 will disassemble the data object 500 into an encoding number x*n=16*800=12800 of redundant fragments 600, which also comprise the data object identifier 510. This encoding number x*n=16*800=12800 corresponds to an encoding multiple x=800 of a fragment spreading width n=16. This fragment spreading width n=16=k+f=10+6 consists of the sum of a basic fragment storage element count k=10 and a redundant fragment storage element count f=6. This redundant fragment storage element count f=6 corresponds to the number of storage elements 300 of the fragment storage set 34 that store fragments 600 of the data object 500 and are allowed to fail concurrently for the fragment storage subset 34. The basic fragment storage element count k=10, corresponds to the number of storage elements 300 that must store fragments 600 of the data object 500 and are not allowed to fail. The hybrid encoding module 400 for example makes use of an erasure encoding scheme to produce these encoding number x*n=16*800=12800 redundant fragments 600.1-600.12800. Reference is made to known erasure encoding schemes, such as in WO2009135630, which hereby is incorporated by reference. In this way each one of these redundant fragments 600, such as for example fragment 600.1 comprises encoded data of equal size of the data object 500 divided by a factor equal to the encoding multiple of the basic fragment storage element count x*k=800*10=8000. This means that the size of fragment 600.1 in the example above with a data object of 64 MB will be 8 kB, as this corresponds to 64 MB divided by x*k=800*10=8000. Fragment 600.1 will further comprise decoding data f(1), such that the data object 500 can be decoded from any combination of the redundant fragments 600 of which the number x*k=800*10=8000 corresponds to the encoding multiple x=800 of the basic fragment storage element count k=10. To accomplish this the hybrid encoding module 400 will preferably make use of an erasure encoding scheme with a rate of encoding r=k/n=10/16 which corresponds to the basic fragment storage element count k=10 divided by the fragment spreading width n=16. In practice this means that the hybrid encoding module 400 will first split the data object 500 of 64 MB into x*k=800*10=8000 chunks of 8 kB, subsequently using an erasure encoding scheme with a rate of encoding of r=k/n=10/16, it will generate x*n=800*16=12800 encoded redundant fragments 600.1-600.12800 which comprise 8 kB of encoded data, this means encoded data of a size that is equal to the 8 kB chunks; and decoding data f(1)-f(12800) that allows for decoding. The decoding data could be implemented as for example be a 16 bit header or another small size parameter associated with the fragment 600, such as for example a suitable fragment identifier. Because of the erasure encoding scheme used, namely a rate of encoding r=k/n=10/16, the fragments 600.1-600.12800 allow the data object 500 to be decoded from any combination of fragments 600 which corresponds to the encoding multiple of the basic fragment storage element count x*k=800*10=8000, such as for example the combination of fragments 600.1-600.4000 and fragments 600.8001-600.12000. It is clear that according to this embodiment of the distributed object storage system, 1 GB of data objects 500 being processed by the hybrid encoding module will result in a need for a storage capacity of 1.6 GB+1 GB=2.6 GB, as the storage of the fragments on the fragment storage subset 34, the storage cost of such an erasure coding scheme is inversely proportional to the rate of encoding and in this particular embodiment will be a factor of 1/r=1/(10/16)=1.6, results in 1.6 GB of data and storage of the replication storage subset 36 results in 1 GB of data. For a data object 500 of 64 MB, this results in a need for storage capacity of 64 MB*1.6+64 MB=166 MB.

Subsequently, as shown in FIG. 5, the spreading module 410 will store the encoding number x*n=800*16=12800 of encoded redundant fragments 600.1-600.12800 on a number of storage elements 300 which corresponds to the fragment spreading width n=16, such as for example storage elements 300.1-300.16. The spreading module 410 will store on each of these storage elements 300.1-300.16 the encoding multiple x=800 of these fragments 600. As shown in FIG. 5 fragments 600.1-600.800 are stored on storage element 300.1, the next x=800 of these fragments are stored on storage element 300.2 and so on until the last x=800 of these fragments 12001-12800 are stored on storage element 300.16. According to an embodiment, the storage elements 300 comprise a suitable file system in which the fragments 600 are stored by the spreading module 410 in the form of fragment files 700. Preferably the spreading module 410 groups all fragments 600 that need to be stored on a single storage element 300 into a single fragment file 700 that is subsequently stored in the file system that is in use on the respective storage element 300. For the embodiment shown in FIG. 5 this would mean that the fragments 600.1-600.800 which need to be stored on the storage element 300.1 would be grouped in a single fragment file 700.1 by the spreading module 410. This fragment file 700.1 then being stored in the file system of storage element 300.1. As shown in FIG. 5 storage elements 300.1-300.10 are arranged in storage node 30.1 and storage elements 300.11-300.16 are arranged in storage node 30.2.

Although alternative methods for determining the share of fragments to be stored on specific storage elements 300 are well known to the person skilled in the art and are for example described in WO2009135630 it is generally preferable to configure the spreading module 410 to store an equal share of the total amount of fragments 600 on each of the storage elements 300 selected for storage. This allows for a simple configuration of the spreading module 410 which then for example generates a fragment file 700 for storage on each of the storage elements 300 selected that will comprise an equal share of the total amount of fragments 600 and will thus also be equal in size. In the example as shown in FIG. 5 this would result in 16 fragment files 700.1-700.16 each comprising 800 fragments 600 and each fragment file 700 would have a size 6400 kB as it comprise 800 times 8 kB of fragment data 510.

It is clear that according to alternative embodiments other values could have been chosen for the parameters x, f, k, n=k+f and r=k/n mentioned in embodiment above, such as for example x=400, f=4, k=12; n=k+f=12+4=16 and r=12/16; or any other possible combination that conforms to a desired reliability policy for redundancy and concurrent failure tolerance of storage elements 300 of the fragment storage subset 34 of the distributed object storage system 1.

According to still a further alternative there could be provided a safety margin to the encoding multiple 802 for generating fragments by the hybrid encoding module 400. In such an embodiment some of the storage efficiency is traded in for some additional redundancy over the theoretical minimum. This preventively increases the tolerance for failures and the time window that is available for a repair activity. However according to a preferred embodiment this safety margin will be rather limited such that it only accounts for an increase in fragments that must be generated and stored of for example approximately 10% to 30%, such as for example 20%.

Figure 6:
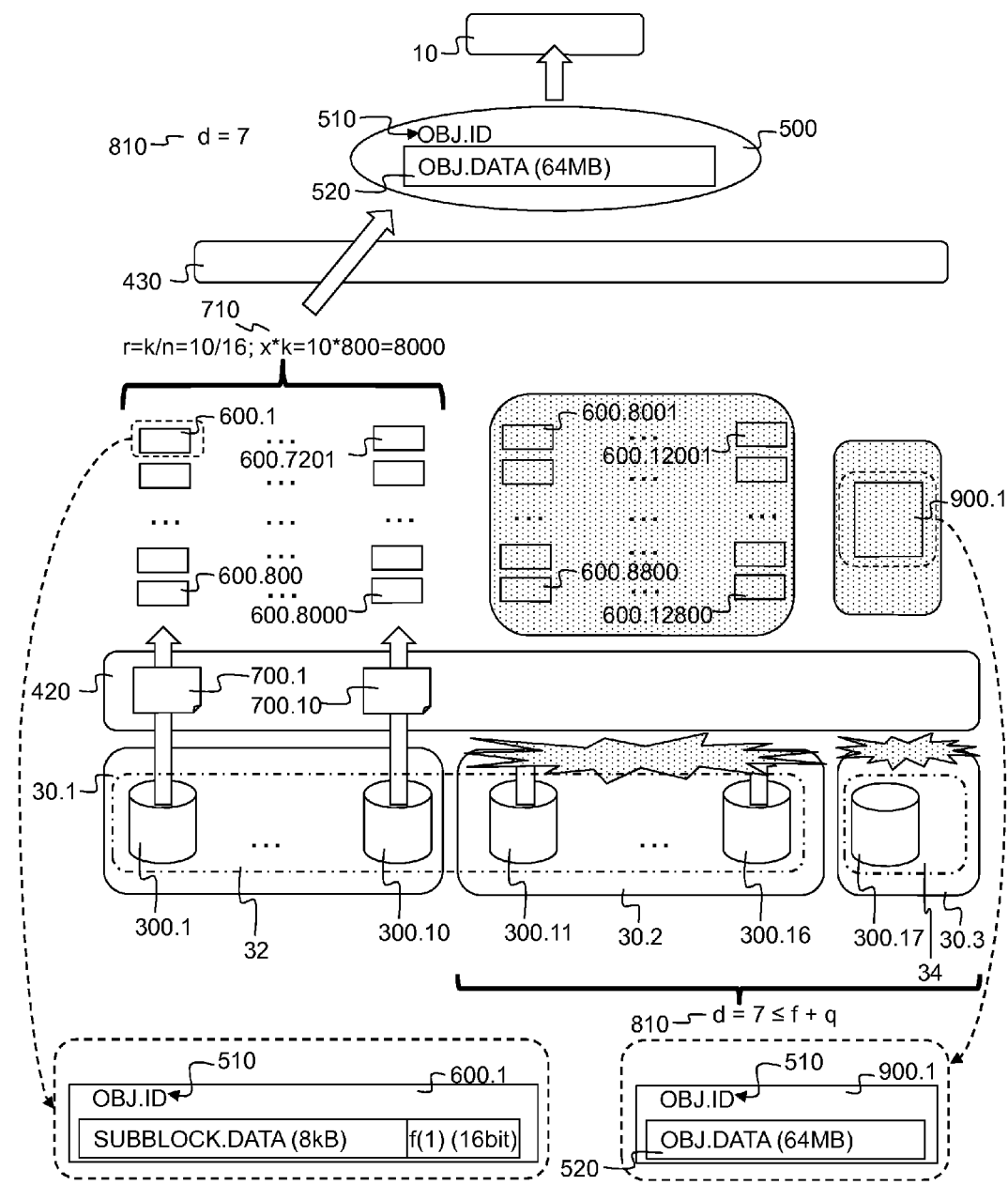
FIG. 6 schematically illustrates a retrieval operation according to the hybrid storage and retrieval option.

FIG. 6 shows the corresponding retrieval operation according to this hybrid storage and retrieval option performed by the embodiment of the distributed object storage system 1 as described for the storage operation of FIG. 5 that is able to tolerate seven concurrent failures of a storage element 300. The data object 500 is requested from the distributed object storage system 1 by the application 10 requesting a retrieval operation. As explained above, in this embodiment the requested data object 500 can be addressed by its object identifier 510. In response to this request for a retrieval operation the clustering module 420 of the controller node 20 will initiate the retrieval of one of the replication copies 900 associated with the corresponding data object identifier 510 stored by the spreading module 410 on the replication storage subset 36. In this embodiment, the clustering module 420 will try to retrieve the replication file 910.1 that was stored on storage element 300.17.

In case this replication file 910.1 or other replication files 910 with corresponding data object identifier 510, are not retrievable, e.g. when there is a problem in network connectivity between the controller node 20 and storage node 30.3 as indicated in FIG. 6, the clustering module 420 of the controller node 20 will initiate the retrieval of the fragments 600 associated with this data object identifier 510. It will try to retrieve the encoding number x*n=16*800=12800 of redundant fragments 600.1-600.12800 from the fragment files 700.1-700.16 that were stored on the storage elements 300.1-300.16. Because of the encoding technology used and the corresponding decoding techniques available, it is sufficient for the clustering module 420, to retrieve the encoding multiple of the basic fragment storage element count x*k=800*10=8000 of the redundant fragments 600 from these storage elements 300.1-300.16. This could be the case when for example there is a problem in network connectivity between the controller node 20 and storage node 30.2 as indicated in FIG. 6. In that case the retrieval operation of the clustering module will be able to retrieve the fragments 600.1-600.8000 which corresponds to the encoding multiple of the basic fragment storage element count x*k=800*10=8000. The retrieved blocks 600.1-600.8000 allow the decoding module 430 to assemble data object 500 and offer it to the application 10. It is clear that any number in any combination of the redundant fragments 600 corresponding to the data object 500, as long as their number is equal to or greater than the encoding multiple of the basic fragment storage element count x*k=800*10=8000, would have enabled the decoding module 430 to assemble the data object 500.

Figure 7:
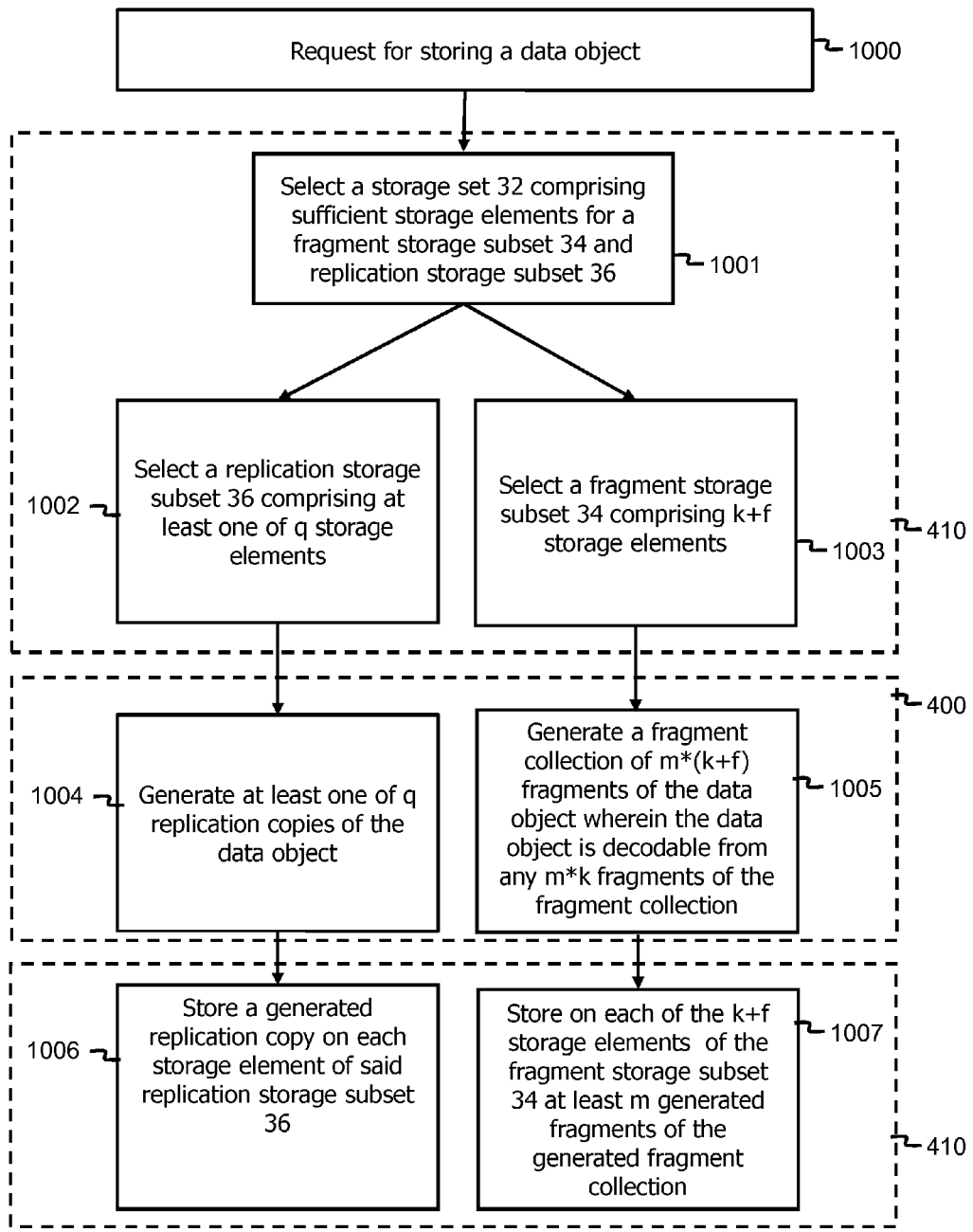
FIG. 7 illustrates an embodiment of a method for operating a distributed storage system.

As shown in FIG. 7, the distributed storage system 1 can be operated according to a hybrid storage and retrieval option, i.e. according to the method illustrated by the steps 1000-1006 of FIG. 7, such that the desired concurrent failure tolerance 810, also referenced above as d, of concurrent failures of the storage elements 300 of the storage set 32 can be tolerated, which cold for example be seven as mentioned above, but also any other suitable plurality such as for example four, five, six, eight or more.

After a request is received for storing a data object in step 1000. A storage set 32 is selected at step 1001 comprising sufficient storage elements 300 for a fragment storage subset 34 and a replication storage subset 36. Preferably the fragment storage subset 34 comprises the largest number of storage elements 300 and thus the storage subset 32 thus comprises at least a sufficient number of storage elements 300 for this fragment storage subset 34, optionally increased at least partially by the number of storage elements for a replication storage subset 36 when there is no overlap.

At step 1002 the replication storage subset 36 comprising the desired number q of one or more storage elements 300 is selected by the spreading module 410. At step 1003 a fragment storage subset 34 comprising the desired number k+f of storage elements 300 is also selected by the spreading module 410.

The desired number q of one or more replication copies 900 of the data object 500 is generated by the hybrid encoding module 400 in step 1004. As explained above, the number of replication copies 900 could is preferably equal to one as this results in the most optimal scenario with respect to storage cost for the hybrid storage and retrieval option. But alternative embodiments are possible, in which the number of replication copies is for example two, or even more, as long as in general the number of replication copies q is smaller than the desired concurrent failure tolerance d. Next to the generation of replication copies 900, as explained above, at step 1005 a fragment collection 730 of x*(k+f) fragments of the data object 500 is generated by the hybrid encoding module 400. Herein the data object 500 is decodable from any x*k fragments 600 of the fragment collection 730.

On the replication storage subset 36 comprising the desired number q of one or more storage elements 300 selected in step 1002, the spreading module 410, then stores the generated one or more replication copy 900 on each storage element 300 of the replication storage subset 36 at step 1006. Also on the fragment storage subset 34 comprising k+f storage elements 300 selected in step 1003, the spreading module 410 in step 1007 then stores on each of the k+f storage elements 300 of the fragment storage subset 34 at least x generated fragments 600 of the generated fragment collection 730.

Figure 8:
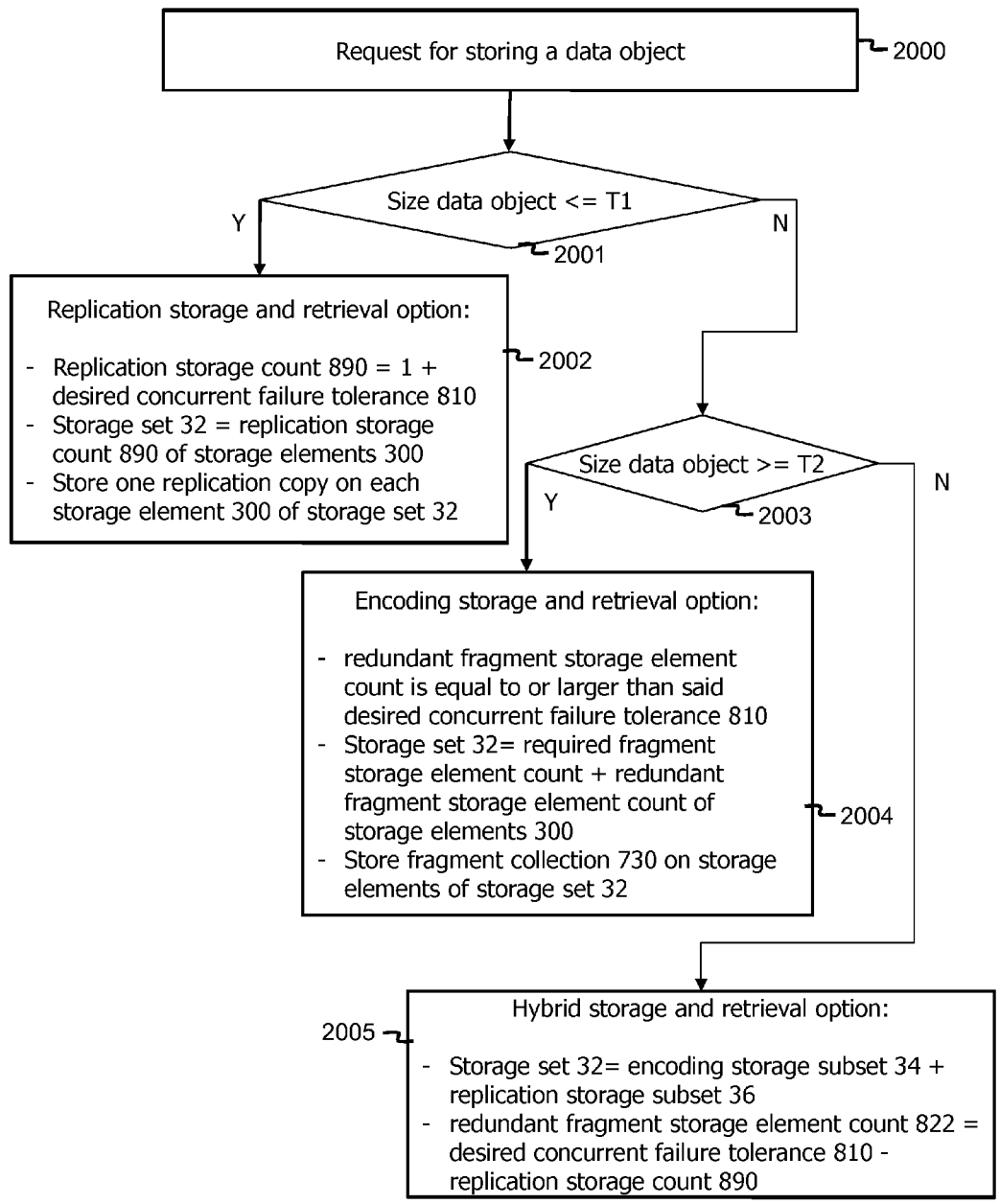
FIG. 8 shows a further embodiment of a method of operating such a distributed storage system.

According to a further embodiment, such as for example shown in FIG. 8, the distributed data storage system 1, can additionally also be operated according to a replication storage and retrieval option when the size of said data object 500 is smaller than or equal to a first data object size threshold T1, e.g. 64 kB or any other suitable threshold for relatively small data objects. In that case, when a request for storing a data object 500 is received at step 2000, in step 2001 the process will be continued to step 2002 and replication copies 900 of the data object 500, are generated and stored on each storage element 300 of the selected storage set 32 which comprises a replication storage count 890 of storage elements 300 that is equal to the sum of one plus the desired concurrent failure tolerance. With a desired concurrent failure tolerance of seven as described in the example above the storage set 32 would thus comprise eight storage elements 300 on which then replication copies 900 of the data object 500 are stored. Hereby, a replication copy 900 can be retrieved from each storage element 300 of said selected storage set 32. Such an option is preferable for such small data objects as the overhead associated with generation, storage and retrieval and decoding the large number of even smaller fragments is avoided. Additionally this reduces the negative impact of the effect of the block size of a file system on the storage elements 300, for example for a file system comprising a block size of 4 kB, this negative impact will be already relevant for data objects smaller than 128 kB, for an encoding scheme with a basic fragment storage element count k=10 and a redundant fragment storage element count f=6, this becomes a critical issue for data objects smaller than 64 kB and certainly for data objects with a size of less than ten times the block size of 4 kB.

According to the embodiment shown in FIG. 8, the distributed data storage system 1, can also be operated according to an encoding storage and retrieval option when the size of said data object 500 is greater than to a second data object size threshold T2, e.g. 1 GB or any other suitable threshold for relatively large data objects. It is clear that the second data object size threshold T2 is preferably several orders of magnitude greater than the first data object size threshold T1. In that case, when storing a data object, the method proceeds from step 2000 via step 2001 and to step 2003 and to step 2004, where a fragment collection 730 is generated, wherein a fragment sub-collection 720 of fragments 600 is stored on each storage element 300 of the selected storage set 32, in a similar way as described above. Hereby, a data object 500 is decodable from any combination of retrieved fragments 600 of which the number corresponds to a basic fragment count 812. However now the redundant fragment storage element count will be equal to or greater than the desired concurrent failure tolerance which according to the example described above is for example seven. When similar as described above the basic fragment storage element count is for example equal to ten, the storage set 32 will comprise a set of seventeen storage elements 300 among which the fragment collection 730 will be distributed so that each of these storage elements comprises a fragment sub-collection 720 comprising for example 800 fragments as described above, so that a concurrent failure of seven storage elements can be tolerated. Such an option is preferable for such very large data objects as an optimal use is made of the parallel bandwidth of these storage elements and their network connection during storage and retrieval operations and the use of storage capacity is further optimized and more efficient as with an encoding rate of r=k/n=10/17, the storage cost will only be a factor of 1.7.

It is further also clear that according to the embodiment of FIG. 8, when the size of said data object 500 is in the range between the first data object size threshold T1 and the second data object size threshold T2, the method will proceed from step 2000 along step 2001, to step 2003 and to 2005 to a hybrid storage and retrieval option with a storage set 32 comprising an encoding storage subset 34 and a replication storage subset. As described in more detail with respect to FIGS. 5 and 6, according to an embodiment where the replication storage subset 36 does not overlap with the encoding storage subset 34, the redundant fragment storage element count 822 will equal to the desired concurrent failure tolerance 810 minus the replication storage count 890. Preferably the replication storage count 890 is then equal to one as in this way the effect on the storage cost is minimized, while additionally the number of input output operations during a subsequent retrieval operation is minimized without compromising the level of desired concurrent failure tolerance.

It is clear that different embodiments of methods of operation are possible then the one described above with reference to FIG. 8, as long as in general the hybrid storage and retrieval option as described above is present. Although the embodiment of FIG. 8 presents further improvements with respect to particularly small or large data objects, even when only using the hybrid storage and retrieval option data objects of any size will be processed with a desired level of efficiency even when the distributed storage system is subject to varying loads with respect to the network bandwidth, input output operations, etc. According to embodiments of the hybrid storage and retrieval option in which the fragments and replication copy are generated concurrently and subsequently spread concurrently, this will automatically result in the fastest response time for a subsequent retrieval operation irrespective of the size of the data object or the particular load condition of the distributed storage system. According to an alternative embodiment in which for example first the replication copy is generated or attempted to be retrieved this results in a particularly simple embodiment in which processing power needed for decoding fragments is only needed for data objects of which the replication copy cannot be retrieved. It is clear that still further embodiments are possible with specific advantages.

According to a further embodiment, the desired concurrent failure tolerance 810 can be chosen differently for respectively the replication storage and retrieval option, the hybrid storage and retrieval option and the encoding storage and retrieval option. For example, when the distributed storage system 1 is operated according to the replication storage and retrieval option, the replication storage count 890 can for example be chosen equal to three. For this option, the desired concurrent failure tolerance 810 consequently equals two. For a small file with size 10 kB, the storage cost would be 200%, corresponding to 20 kB. When the system is operated according to the hybrid storage and retrieval option, the desired concurrent failure tolerance 810 can be chosen for example equal to four, wherein the redundant fragment storage element count 822 equals three and the replication storage count 890 equals one. For a medium file with size 10 MB, the storage cost then would be 143% (i.e. 3/7+1), corresponding to 14.3 MB. When the system is operated according to the encoding storage and retrieval option, the desired concurrent failure tolerance 810 can be chosen for example equal to five, wherein the redundant fragment storage element count 822 consequently equals five. For a large file with size 10 GB, the storage cost would be 28% (i.e. 5/18), corresponding to 2.8 GB.

It is clear that in general the method and system described above can largely be implemented as a computer program comprising software code adapted to perform this method when executed by a processor of suitable computing system, such as for example a suitable server or a general purpose computer.

Although the present disclosure has been illustrated by reference to specific embodiments, it will be apparent to those skilled in the art that the disclosure is not limited to the details of the foregoing illustrative embodiments, and that the present disclosure may be embodied with various changes and modifications without departing from the scope thereof. The present embodiments are therefore to be considered in all respects as illustrative and not restrictive, the scope of the disclosure being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any references in the claims shall not be construed as limiting the respective claims concerned. The terms or references "first", "second", third", . . . ; "A", "B", "C", . . . ; "1", "2", "3", . . . ; "a", "b", "c", . . . ; "i", "ii", "iii", . . . , and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the disclosure are capable of operating according to the present disclosure in other sequences, or in orientations different from the one(s) described or illustrated above.

The invention claimed is:
1. A distributed storage system comprising:
(A) a plurality of storage elements adapted to redundantly store and retrieve a data object on a storage set, which is a set comprising two or more of said storage elements of said distributed storage system, such that a desired concurrent failure tolerance of concurrent failures of said storage elements of said storage set can be tolerated;
(B) a plurality of storage nodes comprising a share of said plurality of storage elements of said distributed storage system; and
(C) at least one controller node coupled to or at least partly comprised within said storage nodes, the at least one controller node including a spreading module adapted to:

(1) select a fragment storage subset comprising a fragment spreading width of said storage elements of said storage set, said fragment spreading width being the sum of:
   (a) a basic fragment storage element count corresponding to the number of storage elements of said fragment storage subset which are not allowed to fail; and
   (b) a redundant fragment storage element count corresponding to the number of storage elements of said fragment storage subset which are allowed to concurrently fail;
(2) select a replication storage subset comprising a replication storage count, which is equal to or greater than one, of said storage elements of said storage set, whereby the sum of said redundant fragment storage element count and said replication storage count is equal to or greater than said desired concurrent failure tolerance;
(3) store, on each storage element of said fragment storage subset, a fragment sub-collection comprising at least an encoding multiple of fragments generated by a hybrid encoding module; and
(4) store, on each storage element of said replication storage subset, one replication copy generated by said hybrid encoding module;
wherein said hybrid encoding module is adapted to generate a fragment collection comprising at least said encoding multiple multiplied by said fragment spreading width of fragments of said data object, and said replication storage count of replication copies of said data object.

2. The distributed storage system according to claim 1, further comprising:
(D) a clustering module adapted to:
   (1) retrieve one of said replication copies stored by said spreading module from said replication storage subset; and/or
   (2) retrieve at least a basic fragment count of said fragments stored by said spreading module from said fragment storage subset from which said data object is decodable, said basic fragment count corresponding to said basic fragment storage element count multiplied by said encoding multiple; and
(E) a decoding module adapted to respectively:
   (1) generate said data object from said replication copy retrieved by said clustering module; and
   (2) generate said data object from a combination of said fragments retrieved by said clustering module of which the number is at least said basic fragment count.

3. The distributed storage system according to claim 1, wherein:
(i) said replication storage count is smaller than said redundant fragment storage element count and said redundant fragment storage element count is greater than or equal to three, or
(ii) the replication storage count is equal to one and the redundant fragment storage element count is greater than or equal to three.

4. The distributed storage system according to claim 1, wherein:
(i) said fragment storage subset comprises said replication storage subset; and
(ii) said desired concurrent failure tolerance is equal to said redundant fragment storage element count.

5. The distributed storage system according to claim 1, wherein:
(i) said fragment storage subset and replication storage subset do not overlap; and
(ii) said redundant fragment storage element count is equal to said desired concurrent failure tolerance minus said replication storage count.

6. The distributed storage system according to claim 2, wherein said clustering module is further adapted to:
(1) attempt to retrieve one of said at least one replication copy stored by said spreading module on said replication storage subset; and
(2) if said attempt to retrieve one of said at least one replication copy fails, further attempt to retrieve at least said basic fragment count of said fragments stored by said spreading module on said fragment storage subset.

7. The distributed storage system according to claim 1, wherein said hybrid encoding module is further adapted to first generate at least one of said replication storage count of replication copies of said data object.

8. The distributed storage system according to claim 7, wherein said spreading module is further adapted to first store one of said replication copies on said replication storage subset as soon as it is generated by said hybrid encoding module.

9. The distributed storage system according to claim 1, wherein the distributed storage system comprises a replication storage and retrieval option; and
when said distributed storage system is operated according to said replication storage and retrieval option:
   (1) said hybrid encoding module is further adapted to generate a replication storage count of replication copies of said data object, said replication storage count being equal to one plus said desired concurrent failure tolerance;
   (2) said spreading module is further adapted to select said storage set comprising said replication storage count of said plurality of storage elements of said storage set and store one of said replication copies generated by said hybrid encoding module on each redundant storage element of said storage set;
   (3) said clustering module is further adapted to retrieve one of said replication copies stored by said spreading module on said storage set; and
   (4) said decoding module is further adapted to generate said data object from said replication copy retrieved by said clustering module.

10. The distributed storage system according to claim 9, wherein: said distributed storage system is operated according to a hybrid storage and retrieval option when the size of said data object is greater than a predetermined first data object size threshold; and said distributed storage system is operated according to said replication storage and retrieval option when the size of said data object is smaller than or equal to said predetermined first data object size threshold.

11. The distributed storage system according to claim 1, wherein:
the distributed storage system comprises an encoding storage and retrieval option; and
when said distributed storage system is operated according to said encoding storage and retrieval option:
   (1) said hybrid encoding module is further adapted, when storing said data object, to generate a fragment collection comprising at least an encoding multiple multiplied by a fragment spreading width of fragments of said data object, said fragment collection being configured such that said data object is decodable from any combination of said fragments of which the number corresponds to a basic fragment count which corresponds to a basic fragment storage element count multiplied by said encoding multiple;

(2) said spreading module is further adapted, when storing said data object, to:
  (a) select said storage set comprising a fragment spreading width of said storage elements of said storage set, said fragment spreading width being the sum of:
    (i) said basic fragment storage element count corresponding to the number of storage elements of said storage set which are not allowed to fail; and
    (ii) a redundant fragment storage element count corresponding to the number of storage elements of said storage set which are allowed to concurrently fail; whereby said redundant fragment storage element count is equal to or greater than said desired concurrent failure tolerance; and
  (b) store, on each storage element of said storage set, a fragment sub-collection comprising at least said encoding multiple of fragments generated by a hybrid encoding module;

(3) said clustering module is further adapted to retrieve at least said basic fragment count of said fragments stored by said spreading module from said storage set; and (4) said decoding module is further adapted to generate said data object from a combination of said fragments retrieved by said clustering module of which the number is at least said basic fragment count.

12. The distributed storage system according to claim 11, wherein: said distributed storage system is operated according to said encoding storage and retrieval option when the size of said data object is greater than a predetermined second data object size threshold; and said distributed storage system is operated according to said hybrid storage and retrieval option when the size of said data object is smaller than or equal to said predetermined second data object size threshold.

13. The distributed storage system according to claim 10, wherein, when said distributed storage system is operated according to an encoding storage and retrieval option:
  (1) said hybrid encoding module is further adapted, when storing said data object, to generate a fragment collection comprising at least an encoding multiple multiplied by a fragment spreading width of fragments of said data object, said fragment collection being configured such that said data object is decodable from any combination of said fragments of which the number corresponds to a basic fragment count which corresponds to a basic fragment storage element count multiplied by said encoding multiple;
  (2) said spreading module is further adapted, when storing said data object, to:
    (a) select said storage set comprising a fragment spreading width of said storage elements of said storage set, said fragment spreading width being the sum of:
      (i) said basic fragment storage element count corresponding to the number of storage elements of said storage set which are not allowed to fail; and
      (ii) a redundant fragment storage element count corresponding to the number of storage elements of said storage set which are allowed to concurrently fail; whereby said redundant fragment storage element count is equal to or greater than said desired concurrent failure tolerance; and
    (b) store, on each storage element of said storage set, a fragment sub-collection comprising at least an encoding multiple of fragments generated by a hybrid encoding module;
  (3) said clustering module is further adapted to retrieve at least said basic fragment count of said fragments stored by said spreading module from said storage set; and
  (4) said decoding module is further adapted to generate said data object from a combination of said fragments retrieved by said clustering module of which the number is at least said basic fragment count;
wherein: said distributed storage system is operated according to said encoding storage and retrieval option when the size of said data object is greater than a predetermined second data object size threshold; and said distributed storage system is operated according to said hybrid storage and retrieval option when the size of said data object is smaller than or equal to said predetermined second data object size threshold; and said second data object size threshold is greater than said first data object size threshold.

14. The distributed storage system according to claim 1, wherein: each fragment is associated with decoding data; and said decoding data comprises a forward error correction code, an erasure code, or a rateless erasure code.

15. A method of operating a distributed storage system such that a desired concurrent failure tolerance of concurrent failures of storage elements of a storage set can be tolerated, the method comprising:
  (a) selecting, by a spreading module, a fragment storage subset comprising a fragment spreading width of said storage elements of said storage set, said fragment spreading width being the sum of:
    (i) a basic fragment storage element count corresponding to the number of storage elements of said fragment storage subset which are not allowed to fail; and
    (ii) a redundant fragment storage element count corresponding to the number of storage elements of said fragment storage subset which are allowed to concurrently fail;
  (b) selecting, by said spreading module, a replication storage subset comprising a replication storage count, which is equal to or greater than one, of said storage elements of said storage set, whereby the sum of said redundant fragment storage element count and said replication storage count is equal to or greater than said desired concurrent failure tolerance;
  (c) generating, by a hybrid encoding module, a fragment collection comprising at least said encoding multiple multiplied by said fragment spreading width of said fragments of said data object; and said replication storage count of replication copies of said data object;
  (d) storing, on each storage element of said fragment storage subset, a fragment sub-collection comprising at least an encoding multiple of fragments generated by said hybrid encoding module; and
  (e) storing, on each storage element of said replication storage subset, one replication copy generated by said hybrid encoding module.

16. The method according to claim 15, wherein the fragment collection is generated by the hybrid encoding module such that the data object is decodable from any combination of the fragments of which the number corresponds to a basic fragment count which corresponds to said basic fragment storage element count multiplied by said encoding multiple.

\* \* \* \* \*